(12) United States Patent
Hoehn et al.

(10) Patent No.: US 11,548,121 B2
(45) Date of Patent: Jan. 10, 2023

(54) SUCTION DEVICE

(71) Applicants: J. SCHMALZ GMBH, Glatten (DE); TRUMPF WERKZEUGMASCHINEN GMBH + CO. KG, Ditzingen (DE)

(72) Inventors: Rainer Hoehn, Dornstet-ten (DE); Jonas Horst, Dillin-gen (DE); Magnus Deiss, Stuttgart (DE)

(73) Assignees: J. SCHMALZ GMBH, Glatten (DE); TRUMPF WERKZEUGMASCHINEN GMBH & CO. KG, Ditzingen (DE)

( * ) Notice: Subject to any disclaimer, the term of this patent is extended or adjusted under 35 U.S.C. 154(b) by 32 days.

(21) Appl. No.: 16/498,206

(22) PCT Filed: Mar. 29, 2018

(86) PCT No.: PCT/EP2018/058046
§ 371 (c)(1),
(2) Date: Sep. 26, 2019

(87) PCT Pub. No.: WO2018/178221
PCT Pub. Date: Oct. 4, 2018

(65) Prior Publication Data
US 2021/0170550 A1 Jun. 10, 2021

(30) Foreign Application Priority Data

Mar. 31, 2017 (DE) ..................... 10 2017 106 936.4

(51) Int. Cl.
*B25B 11/00* (2006.01)
*B65G 47/91* (2006.01)
(52) U.S. Cl.
CPC ............ *B25B 11/005* (2013.01); *B65G 47/91* (2013.01)

(58) Field of Classification Search
CPC ........ B25B 11/00; B25B 11/005; B25B 11/02
(Continued)

(56) References Cited

U.S. PATENT DOCUMENTS

| 3,270,771 A | 9/1966 | Morgan et al. |
| 5,388,615 A | 2/1995 | Edlund et al. |

(Continued)

FOREIGN PATENT DOCUMENTS

| DE | 19814262 A1 | 10/1999 |
| DE | 102013222376 B3 | 3/2015 |

(Continued)

OTHER PUBLICATIONS

Translation of WO-2015062779-A1 description (Year: 2021).*
(Continued)

*Primary Examiner* — Lee D Wilson
*Assistant Examiner* — Sarah Akyaa Fordjour
(74) *Attorney, Agent, or Firm* — Ware, Fressola, Maguire & Barber LLP

(57) ABSTRACT

The invention relates to a suction device (12) comprising a valve housing (18), a flexible partition wall (28) which runs in such a way that a control space (30) extends on one side and an intake side (21) lies on the other side, wherein the control space (30) is connected to the intake side (21) via a throttle passage (38), wherein the throttle passage (38) is formed in such a way that a flow resistance for flows is defined by the throttle passage (38) in such a way that, in the case of free suction, a negative pressure in relation to the intake side occurs in the control space (30) on account of the flow resistance. A sealing protrusion (44) protruding into the interior of the control space (30) and an associated seal seat (50) within the control space (30) are provided, wherein the sealing protrusion (44) and seal seat (50) are formed in such a way that, when the sealing protrusion (44) is placed against
(Continued)

Figure 1:
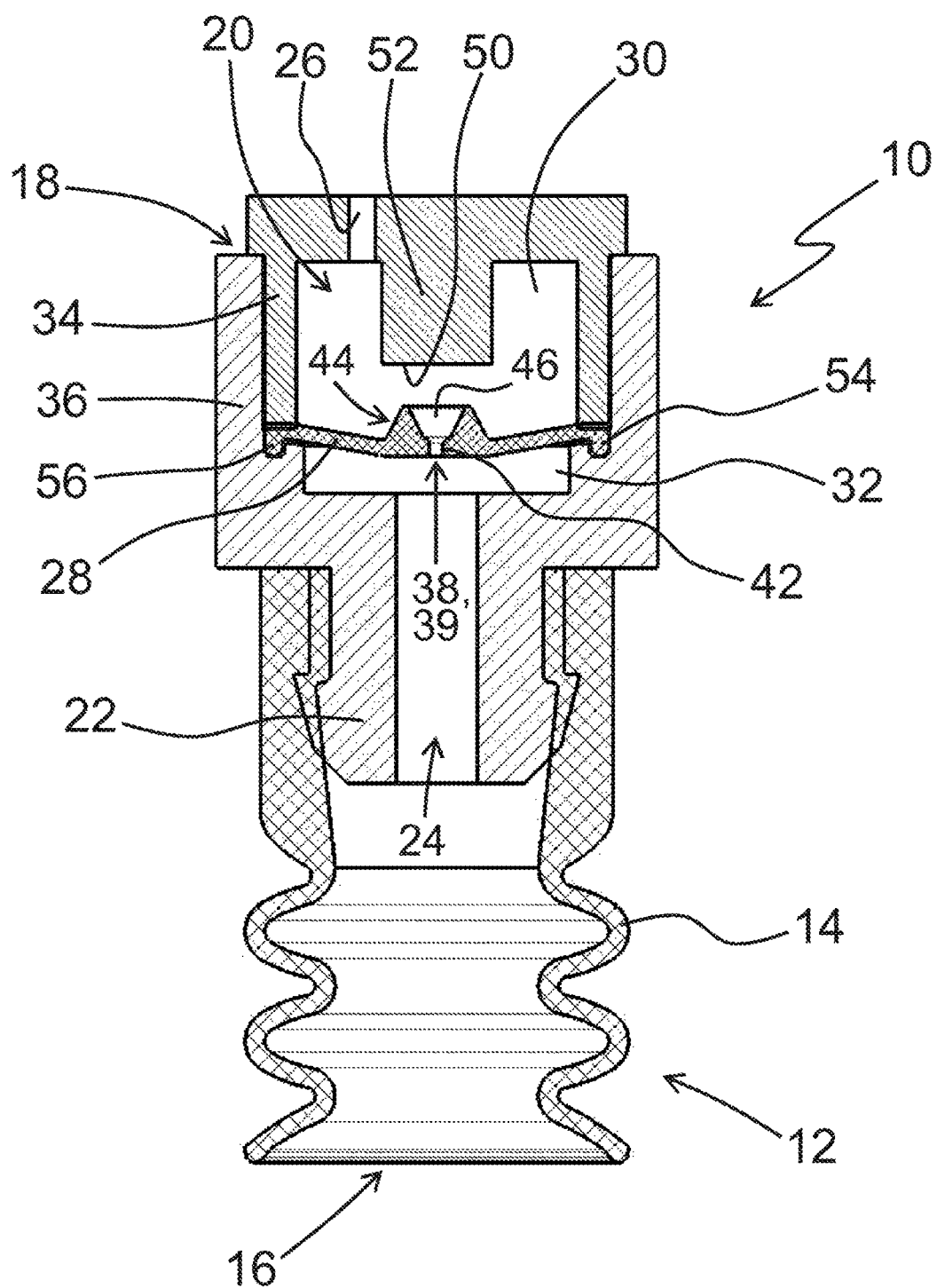

the seal seat (50), the flow path (40) through the throttle passage (38) into the control space (30) is interrupted within the control space (30).

16 Claims, 5 Drawing Sheets

(58) Field of Classification Search
USPC .......................................................... 269/21
See application file for complete search history.

(56) References Cited

U.S. PATENT DOCUMENTS

| | | |
|---|---|---|
| 2006/0096637 A1 | 5/2006 | Maquaire et al. |
| 2014/0238497 A1 | 8/2014 | Jones et al. |
| 2016/0318192 A1 | 11/2016 | Eisele et al. |

FOREIGN PATENT DOCUMENTS

| | | | |
|---|---|---|---|
| EP | 0456884 A2 | 11/1991 | |
| EP | 1918076 A1 * | 5/2008 | ........... B25B 11/005 |
| EP | 1918076 A1 | 5/2008 | |
| FR | 2841627 A1 | 1/2004 | |
| JP | 2003004154 A | 1/2003 | |
| JP | 2016050641 A | 4/2016 | |
| JP | 2016539288 A | 12/2016 | |
| JP | 2017503985 A | 2/2017 | |
| KR | 10-0775870 B1 | 11/2007 | |
| WO | WO-2015062779 A1 * | 5/2015 | ........... B25B 11/007 |

OTHER PUBLICATIONS

Translation of WO-2015062779-A1 claims (Year: 2021).*
Translation of DE19814262A1 description (Year: 2021).*
Translation of DE19814262A1 claims (Year: 2021).*
English language Abstract of DE19814262A1.
English language Abstract and translation of Abstract for DE102013222376B3.
English language Abstract and translation of Abstract for FR2841627A1.
English language Abstract of JP2003004154A.
English language Abstract of JP2016539288A.
English language Abstract of JP2016050641A.
English language Abstract of JP2017503985A.
English language Abstract of DE19814262.
English language Abstract of KR100775870.

* cited by examiner

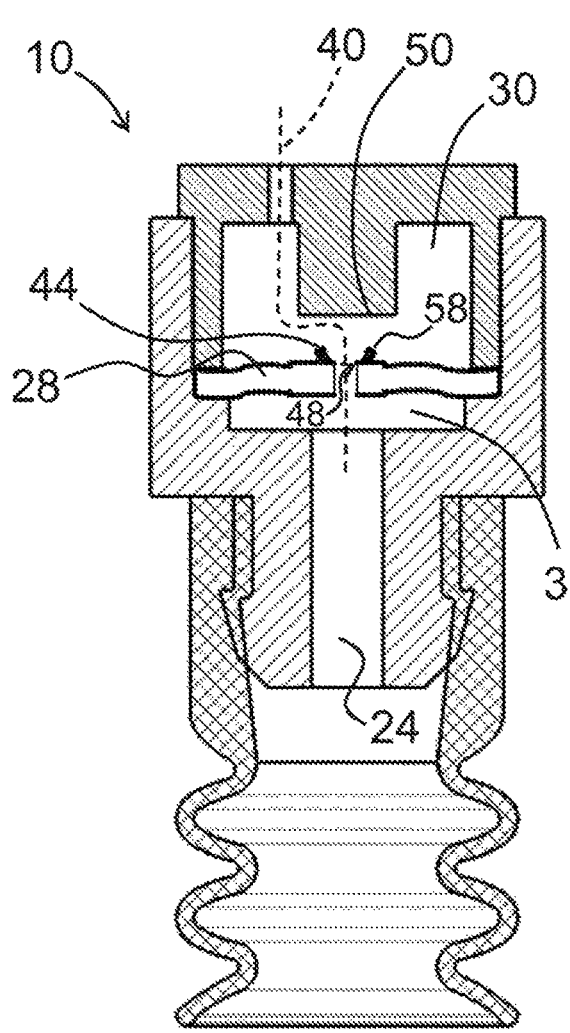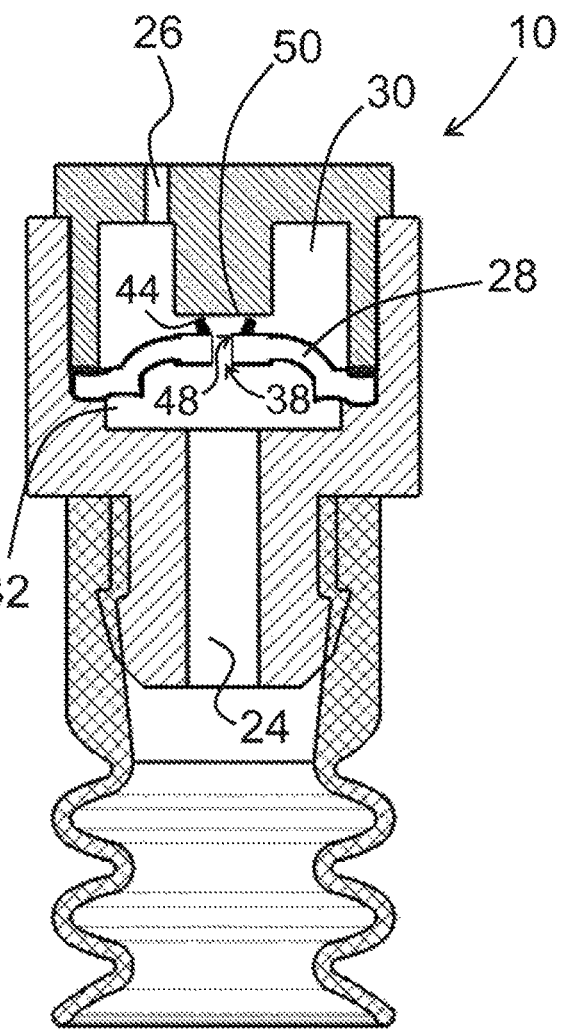

Fig. 5
Fig. 6
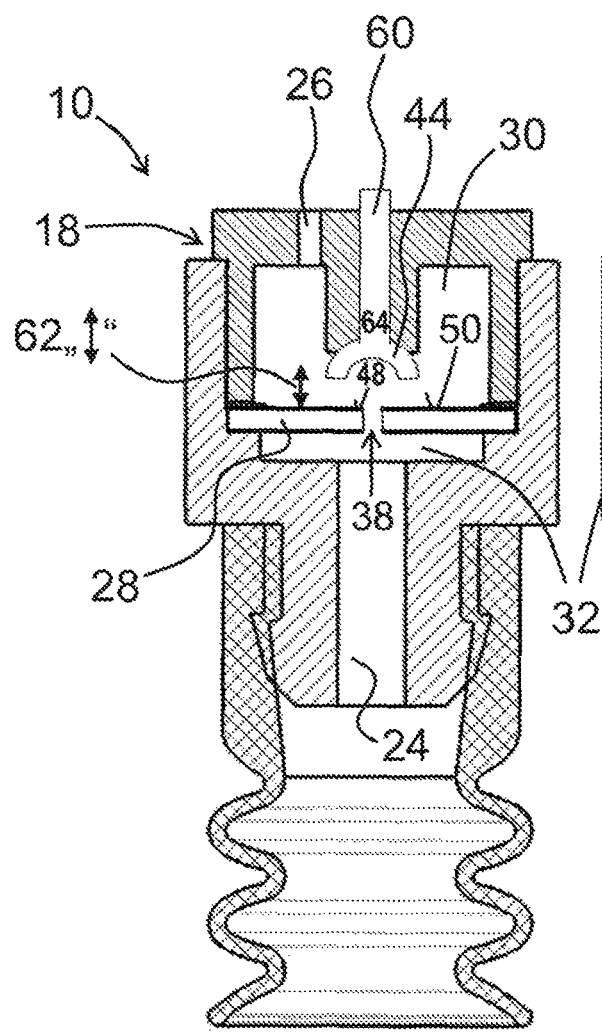
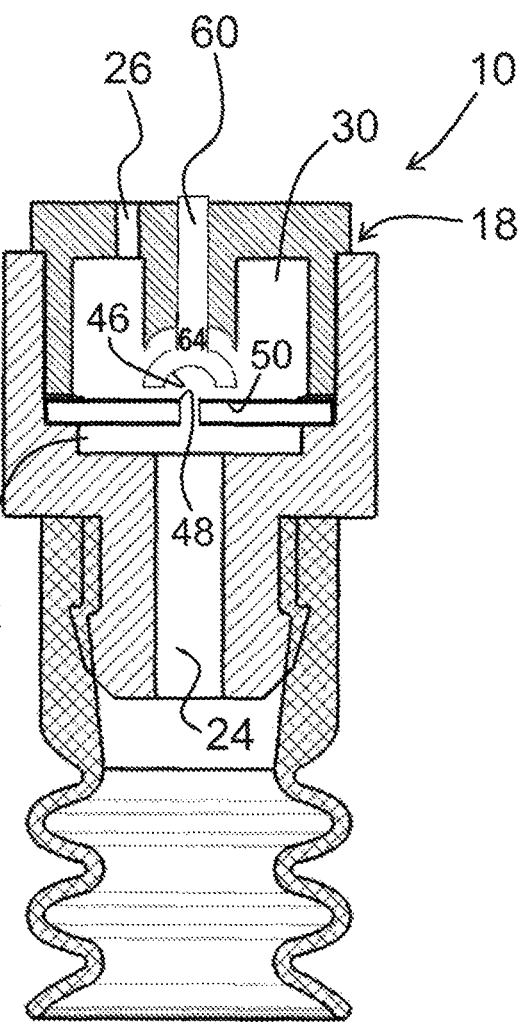

SUCTION DEVICE

The invention relates to a suction device according to the preamble of claim 1. Such suction devices are used for holding objects in place through suction by means of negative pressure.

These suction devices have valve devices that provide the special function of closing automatically during free suction. In the present context, free suction means that the associated suction device is not engaged by an object to be suctioned and can suction freely.

Due to the automatic closing of said valve devices, a dissipation of energy due to free suction can be avoided when the suction point is not engaged. Said valve devices are used particularly in larger systems with a plurality of suction devices in order to save energy when handling objects that do not engage all the suction points and to avoid an impairment of the vacuum supply.

In the prior art, different options for the realization of automatically closing valves are known, wherein different physical operating principles can be exploited.

For example, DE 34 29 444 A1 shows a flow valve, in which a spherical valve body is arranged in a flow channel. The valve body is entrained by the flow pulse of the flow through the flow channel and moved against a seal seat when the flow exceeds a threshold value. Due to their release by the flow pulse, such valves are comparatively susceptible to interference in case of flow surges. Particularly at the beginning of a suction process, an unwanted closing of the valve can occur due to the associated strong flow pulses.

Also known are automatically closing valves, which exploit the fact that a pressure difference, which depends on the strength of the flow, occurs in case of a flow over a flow resistance.

For example, DE 198 14 262 A1 shows a valve with two pressure chambers which are separated from one other by a flexible wall. Both chambers are each connected via flow connections to a vacuum supply. One of the two chambers is constantly connected to the vacuum supply and no suction flow flows through during the operation of the valve. In the other chamber, a negative pressure occurs, the magnitude of which depends on the extent to which a free flow from the suction passage of the valve through the valve to the vacuum supply is possible. In this valve, a pressure difference between the two chambers results in a deformation of the flexible wall and a displacement of a sealing section to a seal seat and the closure of the valve. In this valve, two pressure chambers, which are connected in parallel to the vacuum supply, are thus accommodated in the valve housing. This type of automatically closing valves can therefore be associated with a certain design effort and increased space requirements.

A suction device with an automatically closing valve with the features of the preamble of claim 1 is described in WO 2015/062778 A1. In this case, a flexible wall separates a control space from an intake-side space, wherein a sealing section lying outside the control space is movingly coupled to the flexible partition wall. This valve is therefore not closed because of a flow pulse, which entrains a closing body to a closed position, but because of a pressure difference occurring between two pressure chambers due to flow resistances.

In the case of the aforementioned valve devices, it is of particular importance that a reproducible switching behavior is achieved. In addition, the valve device is frequently supposed to be installed to be integrated in the respective suction device. Therefore, a compact design and a simple design configuration is desirable.

The invention addresses the problem of providing a long-lasting, automatically closing valve device with reproducible and reliable switching behavior in a structurally simple and compact manner for a suction device.

This problem is solved by a suction device with associated valve device according to claim 1. The suction device is designed to hold objects in place through suction by means of negative pressure (e.g., a vacuum gripping device or vacuum clamping device).

The valve device has a valve housing which defines a valve interior. The valve housing has an intake side, which is connected to a suction point of the suction device (e.g., a suction opening or suction body) for suctioning the object. The valve housing also has a supply connection for connecting to a vacuum supply (e.g., vacuum pump, ejector). The supply connection opens into the valve interior.

A flexible partition wall or membrane is provided, which extends within the suction device in such a way that on one side of the flexible partition wall, a control space is defined, and the intake side lies on the other side of the flexible partition wall. The control space extends at least partially in the valve housing. The control space is connected to the supply connection. The control space is also connected to the intake side via a throttle passage.

The connection of the intake side and the control space is designed in such a way that (in the case of free suction at a state of the suction point or the intake side which allows for a free inflow) a flow path from the intake side through the throttle passage into the control space and further from the control space through the supply connection is provided. In particular, the flow path thus extends through the control space.

The throttle passage is formed in such a way that, for flows through the throttle passage from the intake side into the control space, a flow resistance is defined in such a way that, in the case of free suction, a negative pressure in relation to the intake side occurs in the control space on account of the flow resistance.

The flexible partition wall is designed in such a way that it deforms due to the negative pressure, which occurs during the free suction in the control space, in such a way that the volume of the control space decreases under the influence of the negative pressure.

In this respect, the negative pressure, which occurs due to the flow resistance in the throttle passage at a sufficiently large flow along the flow path in the control space in relation to the intake side, is used to deform the flexible partition wall. In the present suction device, the deformation of the flexible partition wall is then utilized to close the valve device. This achieves the desired function of an automatically closing valve.

For this purpose, a sealing protrusion protruding into the interior of the control space and an associated seal seat are provided. The seal seat is also arranged within the control space. The sealing protrusion and the seal seat are arranged to be displaceable relative to one another in the valve interior in such a way that, upon deformation of the flexible partition wall (due to the free suction or due to the resulting negative pressure occurring in the control space), the sealing protrusion is placed against the seal seat.

In this case, sealing protrusion and seal seat are designed and arranged in such a way that, when the sealing protrusion is placed against the seal seat, the flow path through the throttle passage into the control space is interrupted, wherein the interruption occurs within the control space.

In the present context, "free suction" means that a suction takes place at a state of the intake side which allows for free inflow, for example, a free suction in case of an unengaged suction point of the suction device. As a result, a flow along the flow path occurs. This flow is driven by the vacuum supply which is connected to the control space by the supply connection. Initially, there is a strong flow or high flow density along the flow path during the free suction; as a result, a negative pressure in the control space in relation to the intake side occurs on account of the flow resistance in the throttle passage. The negative pressure leads to a compression of the control space and a deformation of the flexible partition wall. As a result, the sealing protrusion is placed against the seal seat and the valve device is closed. Since negative pressure continues to be applied to the control space by the vacuum supply, the negative pressure present in the control space in relation to the intake side is maintained and the valve device remains closed.

However, in the case of suction at an engaged state of the intake side, for example, in case of the presence of an object at a suction opening of the associated suction device, no pronounced flow occurs along the flow path. As a result, no pronounced negative pressure can form via the flow resistance in the control space in relation to the intake side. In that case, the sealing protrusion is not placed against the seal seat and frees the flow path.

Due to the flow resistance of the throttle passage, the pressure difference between the control space and the intake side depends on the strength of the flow along the flow path.

Due to the configuration of the flexible partition wall, the design of the control space and the sealing protrusion and the seal seat, a threshold value for the flow strength or flow density can be defined, and when said threshold value is exceeded, the pressure difference between the control space and intake side is so great that the sealing protrusion is placed against the seal seat.

In the claimed valve, the intake side and the control space lie one behind the other along the flow path. The sealing protrusion and the associated seal seat are both arranged in the control space. This results in a comparatively compact design, particularly because it is not necessary to connect a plurality of pressure chambers in parallel with the vacuum supply side. The valve can be produced in a structurally simple manner because, depending on the design, the sealing protrusion, the seal seat, and the flexible partition wall can be produced as a common component (see below). The switching characteristics of the valve can advantageously be adjusted structurally by the design, e.g., of the flexible partition wall of the control space, the sealing protrusion, and the seal seat.

The sealing protrusion and the seal seat can, relative to one another, assume a closed configuration (in which the valve device is closed) and a release configuration (opened valve device). In particular, the two parts are arranged in such a way that the sealing protrusion and the seal seat are movable relative to one another between the closed configuration and the release configuration. In the closed configuration, the sealing protrusion is placed against the seal seat. In the release configuration, the sealing protrusion and the seal seat are spaced apart from one another and free the flow path.

The intake side of the valve housing can be designed as a simple opening of the valve housing. For example, it is conceivable that the valve housing defines a valve interior which is open on one side and, in relation to the intake side, separated by the flexible partition wall. However, the flexible partition wall can also run outside of the valve interior, e.g., in a suction body of the suction device, wherein the suction body is arranged on the valve housing.

The intake side can also be designed with a suction inlet which connects the valve interior with a suction point of the suction device (e.g., with a suction body or a suction opening). The flexible partition wall or membrane extends particularly within the valve interior. As a result, the flexible partition wall preferably runs in such a way that the control space is defined on one side of the flexible partition wall, and an intake-side space is defined on the other side of the flexible partition wall. In this respect, the flexible partition wall can preferably run within the valve interior and separates a control space from an intake-side space. Said suction inlet preferably opens into the intake-side space. The intake-side space is connected to the control space via the throttle passage. The flow path then runs particularly from the suction inlet through the intake-side space, continues through the throttle passage into the control space and from the control space continues out through the supply connection.

In order to ensure that the flow path through the throttle passage into the control space can be interrupted, it is preferably provided that the throttle passage opens with an outlet opening into the control space. The outlet opening, the sealing protrusion, and the seal seat are particularly arranged in such a way that, when the closed configuration is present, i.e., when the sealing protrusion is placed against the seal seat, the outlet opening is closed, namely within the control space. The outlet opening is closed particularly by the sealing protrusion and/or by the seal seat. In case of the release configuration, the outlet opening is released.

Advantageously, the sealing protrusion is designed in such a way that it has a recess which is open toward the control space and preferably has a funnel-shaped or conical design. The design of the sealing protrusion with a recess allows for a number of different configurations, with which a reliable sealing in the closed configuration is possible, and a reproducible switching behavior can be achieved.

Preferably, the throttle passage opens into the above-mentioned recess of the sealing protrusion. As a result, the sealing protrusion can reliably attach itself to the seal seat. In particular, the recess has a recess bottom, on which the above-mentioned outlet opening is arranged.

The throttle passage can particularly be designed as a channel extending through the flexible partition wall. The channel opens particularly into a surface of the partition wall which faces the control space. In particular, through the interaction with a recess of the sealing protrusion, the outlet opening and the recess form an interacting pair, and so, in case of the closed configuration, the sealing protrusion is reliably attached to the seal seat and the recess reliably covers the outlet opening. The surface, into which the channel opens, can be a planar area of the flexible partition wall. However, it can also be advantageous if the channel opens into a recess-shaped area of the surface, as shall be explained below.

A reliable closing behavior can be achieved in that the sealing protrusion is formed by a bead of the partition wall which surrounds the outlet opening. The bead is particularly a simply closed structure, e.g., an annular bead. This combination of flexible partition wall and sealing protrusion can be produced in a simple manner.

The flexible partition wall preferably has marginal attachment areas, with which it is attached in the suction device. The outlet opening is preferably arranged centrally between the attachment areas. As a result, a large switching path between the closed configuration and the release configuration can be provided by a deformation of the flexible partition wall. The attachment areas are formed, e.g., by a continuous edge or collar of the flexible partition wall. However, depending on the desired switching behavior of the valve, it can also be advantageous if the outlet opening is arranged eccentrically between the attachment areas. According to an advantageous embodiment, the flexible partition wall spans the valve interior and is fastened to the valve housing by means of the attachment areas.

For an advantageous design, the sealing protrusion is arranged on the flexible partition wall. Due to a deformation of the partition wall, the sealing protrusion is thus moved in the direction of the seal seat when a negative pressure occurs in the control space. Elastically deformable plastics or rubber can preferably be used as a material for the sealing protrusion and the partition wall.

The sealing protrusion is preferably integral with the flexible partition wall. In particular, the partition wall and the sealing protrusion consist cohesively of a homogeneous material. For example, the composite of sealing protrusion and flexible partition wall can be cast or injection-molded in a common manufacturing step.

A reliable switching behavior of the valve device can be achieved particularly in that the flexible partition wall is designed and arranged in such a way that it can snap bistably into a first configuration and a second configuration, i.e., that it can move bistably back and forth between these two configurations. In this case, it is particularly provided that, in the first configuration, the sealing protrusion is placed against the seal seat (in accordance with the closed configuration mentioned) and in the second configuration, the sealing protrusion is spaced apart from the seal seat (in accordance with the release configuration). For this purpose, the flexible partition wall is particularly designed as a bistable membrane. In this case, the bistable membrane can advantageously be designed in such a way that, in the second configuration, it exerts a mechanical force against the seal seat. This contributes to an improved closing behavior of the valve device.

An additional embodiment provides an adjustable displacement body which can be moved in and out of the valve interior in such a way that the volume of the control space is adjustable by means of said movement. In particular, the displacement body can be moved into the control space and out of the control space. The displacement body is preferably adjustably arranged on the valve housing, for example, it can be inserted or moved into and also back out of the interior of the control space. A simple design can be achieved by providing an adjusting screw which can be screwed into the control space, thus displacing volume. By adjusting the effective volume of the control space, the responsiveness and the response speed of the valve can be influenced during free suction.

The pair consisting of sealing protrusion and seal seat, which are movable relative to one another, can be realized, for example, in that the seal seat is designed as a section of the valve housing protruding into the control space. In this case, the seal seat is particularly immovable relative to the valve housing. The sealing protrusion is in such case preferably arranged on the flexible partition wall and is moved upon deformation of the flexible partition wall.

It is particularly advantageous if the supply connection in the valve housing runs adjacent to the seal seat, i.e., not through the protruding section, and is arranged to be laterally offset with regard to the throttle passage (which runs through the flexible partition wall). As a result, both a high force effect on the flexible partition wall even in the closed state of the valve and a good surface pressure at the sealing protrusion is achieved.

However, it is also conceivable that the sealing protrusion is arranged on the valve housing and protrudes into the control space. The associated seal seat can then be arranged particularly on the flexible partition wall. A simple design provides that the surface of the flexible partition wall itself forms the seal seat. In this design, it is also advantageous if the sealing protrusion has a recess, as described above. The outlet opening of the throttle passage can then bear particularly against the recess, forming a reliable seal.

In a further design, the sealing protrusion can be arranged on the valve housing by means of an adjustable retaining element in such a way that a distance of the sealing protrusion to the seal seat can be adjusted by adjusting the retaining element. As a result, the switching point of the valve and the response sensitivity can be adjusted. The retaining element can be, for example, an adjusting screw or a bolt which can be inserted in and pulled out of the control space. The adjustable retaining element can simultaneously provide a displacement body in the sense described above. By inserting the retaining element, the effective volume of the control space is subsequently reduced. As a result, the valve responds faster and more sensitively during free suction. At the same time, the distance between the sealing protrusion and the seal seat is reduced by the insertion of the retaining element, which also contributes to a more sensitive response of the valve.

In all of the embodiments described, the flexible partition wall is preferably designed in such a way, and particularly arranged in a tensioned manner in such a way, that the sealing protrusion and the seal seat are pretensioned in a position spaced apart from one another. In this respect, a force is required to move the sealing protrusion toward the seal seat. As a result, the valve closes only when a certain flow strength occurs along the flow path, thus building up a certain negative pressure in the control space with respect to the intake-side space. Due to the strength of the pretension, the switching sensitivity of the valve can be adjusted. This can be advantageous both for embodiments in which the sealing protrusion is arranged on the flexible partition wall, as well as for those embodiments in which the seal seat is arranged on the side of the housing.

In order to achieve the flow resistance, the throttle passage can basically have a defined bottleneck. However, the flow resistance can also be provided in that the throttle passage has a smaller flow cross-section than the rest of the flow path.

In the following, the invention shall be explained in more detail using the drawings.

Figure 2:
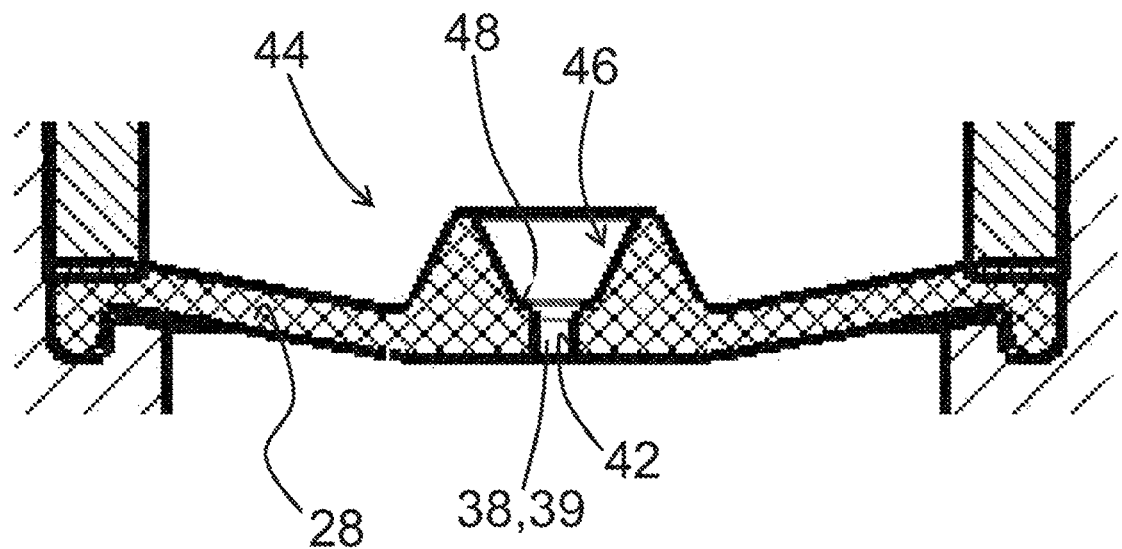
Figure 7:
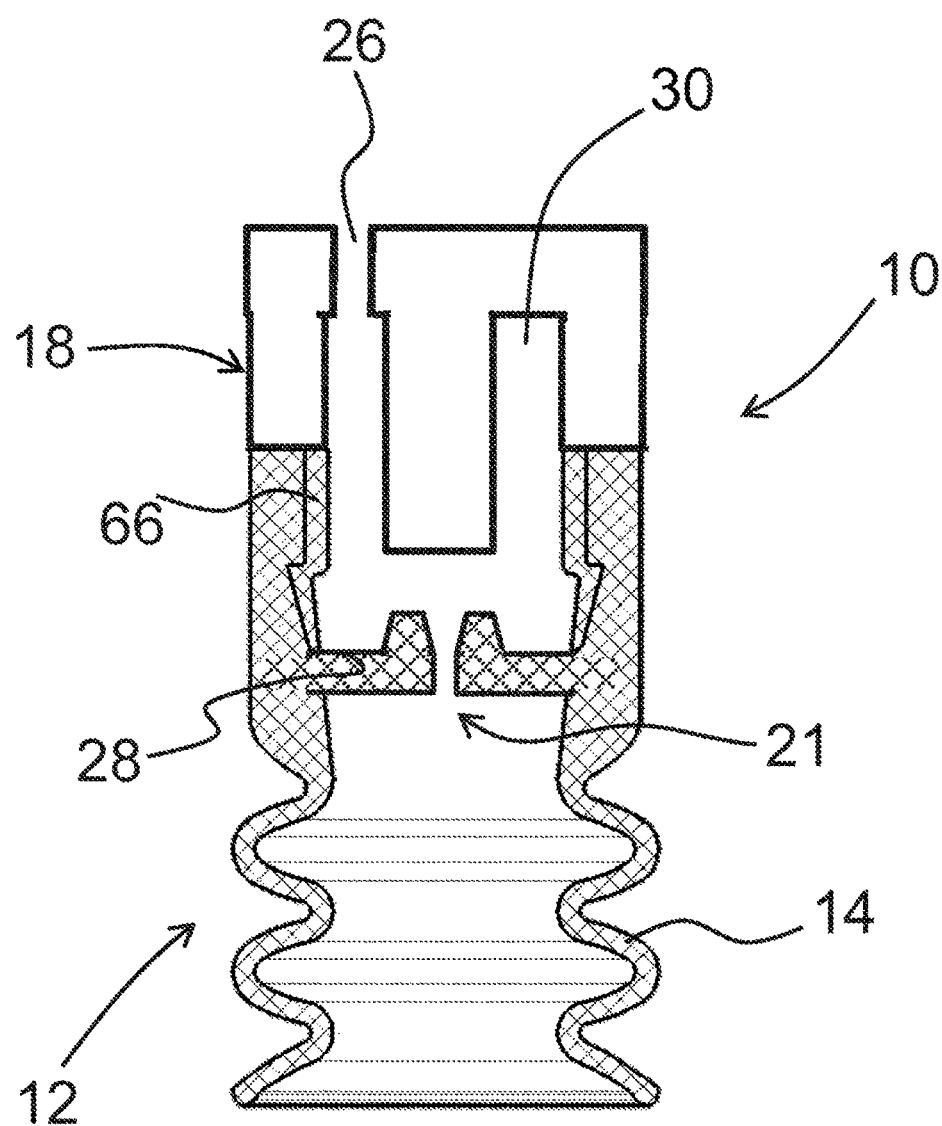

The drawings show in:

FIG. 1: a suction device according to the invention with an outlined valve device;

FIG. 2: an enlarged section of FIG. 1 with details regarding the sealing protrusion;

FIG. 3: a further embodiment of a suction device according to the invention with an associated outlined valve device when the release configuration is present;

FIG. 4: the suction device according to FIG. 3 when the closed configuration is present;

FIG. 5: a further embodiment of a suction device according to the invention with associated valve device in a first adjustment state;

FIG. 6: the suction device according to FIG. 5 in a second adjustment state; and FIG. 7: a further embodiment of a suction device according to the invention.

In the drawings and the following description, the same reference signs are used in each case for identical or corresponding features.

FIG. 1 shows a valve device 10 which is structurally connected to a suction device 12. In the depicted example, the suction device 12 comprises a suction body 14 (e.g., a bellows suction cup), which defines a suction point 16 which is brought toward and applied to an object (not depicted) for holding the object in place by means of negative pressure. The suction point 16 can be, for example, a suction opening of the bellows suction cup.

The valve device 10 has a valve housing 18 which encloses a valve interior 20. The suction body 14 is arranged on the valve housing 18. On one side, the valve housing 18 has an intake side 21 which is connected to the suction point 16. Preferably, the valve housing 18 has a connection section 22, by means of which the valve device can be connected to the suction device (here: suction body 14). In the depicted example, the connection section 22 is a connecting piece, over which the suction body 14 can be pulled.

On the other side, the valve housing 18 has a supply connection 26 (cf. FIG. 1). The supply connection 26 is used to connect the valve interior 20 with a vacuum supply (e.g., vacuum pump, ejector) and is designed, e.g., as a suction passage through the valve housing 18.

The valve interior 20 is spanned by a flexible partition wall 28. In the valve interior 20, the flexible partition wall 28 separates an overhead control space 30. The intake side 21 lies on the side of the flexible partition wall 38 which faces away from the control space.

The intake side 21 preferably comprises an intake-side space 32, which is directly delimited by the flexible partition wall 28 (cf. FIG. 1). The intake-side space is connected to the suction point 16 and the suction body 14 via a suction inlet 24. In this respect, suctioning takes place through the suction inlet 24 into the valve device 10. Preferably, the suction inlet 24 runs through the connection section 22 (cf. FIG. 1).

An advantageous installation can be achieved in that the valve housing 18 has a two-piece design with an upper housing part 34 and a lower housing part 36 which are connectable to one other. In this case, the flexible partition wall 28 can be fastened in the valve interior 20 by arranging the flexible partition wall 28 between the upper housing part 34 and the lower housing part 36, for example, by clamping it between the two housing parts.

The control space 30 is connected to the vacuum supply via the supply connection 26. Via a throttle passage 38, the control space 30 is additionally connected to the intake side 21 or possibly to the intake-side space 32 which extends on the other side of the flexible partition wall 28.

This results in a flow path 40 through the valve device 10, which is shown by way of example in FIG. 3. The flow path 40 runs from the intake side 21 (from the suction inlet 24 through the intake-side space 32) through the throttle passage 38 into the control space 30 and at least in sections through the control space 30 and finally through the supply connection 26 out from the control space 30.

The throttle passage 38 defines a bottleneck 42 along the flow path 40 (FIGS. 1 and 2). As a result, the throttle passage 38 has a flow resistance for flows from the intake-side space 32 into the control space 30.

The flexible partition wall 28 has a sealing protrusion 44 which protrudes into the control space 30. The sealing protrusion 44 preferably has a recess 46 which, in the depicted example, is designed to be conical or funnel-shaped. An outlet opening 48 of the throttle passage 38 opens into a recess bottom of the recess 46. In the depicted example, the throttle passage 38 is designed as a channel 39 which runs through the flexible partition wall 28.

This is shown in detail in FIG. 2 which shows an enlarged view of the sealing protrusion 44 in order to illustrate its design comprising the recess 46, the outlet opening 48, and the channel 39 with the bottleneck 42 through the flexible partition wall 28.

In the control space 30, a seal seat 50 is also provided, and upon deformation of the flexible partition wall 28, the sealing protrusion 44 can be placed against said seal seat 50. In the depicted example, the seal seat 50 is formed by a section 52 which protrudes into the control space 30 of the valve housing 18.

In the case of free suction, i.e., at an unengaged suction point 16, a comparatively strong flow occurs from the suction point 16 to the intake side 21, through the intake-side space 32 and through the throttle passage 38 into the control space 30 due to the negative pressure applied to the supply connection. The flow along the flow path 40 subsequently continues through the supply connection 26 to the vacuum supply. Due to the flow resistance in the throttle passage 38, a negative pressure is formed in the control space 30 in relation to the intake side 21 or the intake-side space 32. As a result, the flexible partition wall 28 is deformed in such a way that the volume of the control space 30 is reduced. The sealing protrusion 44 thus moves toward the seal seat 40 and is placed against it. As a result, the flow path 40 is closed. Since the control space 30 is still connected to the vacuum supply via the supply connection 26, the sealing protrusion 44 thus remains in the position in which it is placed against the seal seat 50 (closed configuration of the valve). However, when the release configuration shown in FIG. 1 is present, the sealing protrusion 44 is spaced apart from the seal seat 50.

As indicated in FIG. 1, the flexible partition wall is preferably integral with the sealing protrusion 44, made, for example, from a homogeneous, flexible material (plastic or rubber).

Preferably, the flexible partition wall 28 has a collar 54 which is continuous in the edge area. The collar 54 is an exemplary design for an attachment area 56 for the flexible partition wall 28 to be attached in the valve interior 20.

As shown in FIGS. 3 and 4, the flexible partition wall 28 can be designed in various ways. In the case of FIGS. 3 and 4, the sealing protrusion 44 is formed in a simple manner by a bead 58 which is continuous around the outlet opening 48.

The flexible partition wall 28 can be formed, for example, as a bistable membrane which can snap bistably in two configurations. By way of example, FIG. 3 shows a first configuration of the flexible partition wall 28, in which the sealing protrusion 44 is spaced apart from the seal seat 50. If, in the case of free suction, a negative pressure is built up in the control space 30, as described above, a force is exerted on the bistable membrane 28 (flexible partition wall) in the direction of a reduction of the volume of the control space 30. As a result, the bistable membrane 28 snaps into a second configuration, which is shown by way of example in FIG. 4. In the second configuration, the sealing protrusion 44 is placed against the seal seat 50.

As shown in FIGS. 5 and 6, the sealing protrusion 44 can also be arranged on the valve housing side and protrude into the control space 30. The seal seat 50 is then formed, for example, by a surface of the flexible partition wall 28 which faces the control space 30 (FIGS. 5 and 6). When the flexible partition wall 28 bulges upwards in relation to the intake side 21 due to a negative pressure in the control space 30, the seal seat is placed against the sealing protrusion 44. In particular, the recess 46 of the sealing protrusion 44 covers the outlet opening 48 of the throttle passage 38 through the flexible partition wall 28.

The sealing protrusion 44 is preferably arranged on the valve housing 18 by means of an adjustable retaining element 60. The retaining element 60 is adjustable insofar as the sealing protrusion 44 can be advanced in the direction toward the seal seat 40 by adjusting the retaining element. A retracting is also possible. As a result, a distance 62 between the sealing protrusion 44 and the seal seat 50 is adjustable when the release configuration is present (FIG. 5). FIG. 6 illustrates a state in which the sealing protrusion 44 is adjusted closer to the seal seat 50 by adjusting the retaining element 60, thereby reducing the distance 62. In this configuration, the valve will respond more sensitively depending on a negative pressure occurring in the control space 30.

For a further design, an adjustable displacement body 64 is provided, which is displaceable to a defined extent into the control space 30. As a result, the effective volume of the control space 30 is adjustable. In the example of FIG. 5, the displacement body 64 is formed by the retaining element 60 for the sealing protrusion 44, without requiring a separate component. When the displacement body 64 is inserted into the control space 30, thus reducing the effective volume, the valve device 10 responds more sensitively to a flow in the case of free suction because a relevant negative pressure builds up more quickly in the control space 30. As a result, the valve device 10 reaches the closed configuration more quickly.

The flexible partition wall 28 can also be arranged in the suction body 14. In this respect, the flexible partition wall 28 can also be provided outside of the actual (immovable) valve housing 18. For example, as shown in FIG. 7, a flexibly designed suction body 14 can be arranged on the valve housing 18, wherein the flexible partition wall 28 extends through an interior of the suction body 14. Preferably, the flexible partition wall 28 is arranged to directly bear against or be adjacent to an opening section 66 of the valve housing 18. As a result, the valve interior 20 can form particularly the control space 30. The intake side 21 is formed by an area adjoining the opening section 66 of the valve housing 18 within the suction body 14.

The invention claimed is:

1. Suction device (12) for holding objects in place through suction by means of negative pressure, having a valve device (10) comprising:
a valve housing (18) which encloses a valve interior (20) and which has a supply connection (26) for connecting to a vacuum supply, and an intake side (21),
a flexible partition wall (28) which runs so that a control space (30) extends on one side of the flexible partition wall (28) inside the valve housing (18), and that the intake side (21) lies on the other side of the flexible partition wall (28),
the control space (30) being connected to the supply connection (26) and the control space (30) is connected to the intake side (21) via a throttle passage (38) so that at free suction at a state of the intake side (21) which allows for free inflow a flow path (40) is provided from the intake side (21) through the throttle passage (38) into the control space (30) and continues from the control space (30) through the supply connection (26), and
the throttle passage (38) being formed so that a flow resistance for flows along the flow path (40) is defined by the throttle passage (38) so that, in the case of free suction at a state of the intake side (21) which allows for a free inflow, a negative pressure in relation to the intake side (21) occurs in the control space (30) on account of the flow resistance, and wherein the flexible partition wall (28) is designed so that it is deformable due to the negative pressure occurring in the control space (30) in the case of free suction, wherein
a sealing protrusion (44) protruding into the interior of the control space (30) and an associated seal seat (50) are provided within the control space (30),
the sealing protrusion (44) and the seal seat (50) are arranged so that upon deformation of the flexible partition wall (28) in the case of free suction,
the sealing protrusion (44) is placed against the seal seat (50),
the sealing protrusion (44) and the seal seat (50) are formed so that, when the sealing protrusion (44) is placed against the seal seat (50), the flow path (40) through the throttle passage (38) into the control space (30) is interrupted within the control space (30),
the throttle passage (38) is designed as a channel extending through the flexible partition wall (28) and opens with an outlet opening (48) into the control space (30), and
the sealing protrusion (44) and seal seat (50) are arranged so that, when the sealing protrusion (44) is placed against the seal seat (50), the outlet opening (48) is closed within the control space.

2. Suction device (12) according to claim 1, wherein the flexible partition wall (28) extends inside the valve housing so that the control space (30) extends on one side of the flexible partition wall (28) and an intake-side space (32) extends on the other side of the flexible partition wall (28), and
said intake-side space (32) is connected to the control space (30) by the throttle passage (38).

3. Suction device (12) according to claim 1, wherein a suction body (14) is provided for application to an object to be suctioned,
the suction body (14) is arranged on the valve housing (18), and
the flexible partition wall (28) extends within the suction body (14).

4. Suction device (12) according to claim 1, wherein the sealing protrusion (44) has a recess (46) which is open toward the control space (30), including where said sealing protrusion is shaped as a funnel.

5. Suction device (12) according to claim 4, wherein the throttle passage (38) opens into the recess (46).

6. Suction device (12) according to claim 1, wherein the channel through the flexible partition wall (28) opens into the outlet opening (48) at a surface of the flexible partition wall (28) which faces the control space (30).

7. Suction device (12) according to at least claim 6, wherein the flexible partition wall (28) has attachment areas (54, 56), and the outlet opening (48) is arranged centrally between the attachment areas (54, 56).

8. Suction device (12) according to claim 1, wherein the flexible partition wall (28) is designed and arranged to snap bistably into a first configuration and a second configuration,
in the first configuration, the sealing protrusion (44) is placed against the seal seat (50), and in the second configuration, the sealing protrusion (44) is spaced apart from the seal seat (50).

9. Suction device (12) according to claim 1, wherein the seal seat (50) is designed as a section (52) of the valve housing (18), said section (52) protruding into the control space (30).

10. Suction device (12) according to claim 1, wherein the sealing protrusion (44) is arranged on the flexible partition wall (28), including being monolithically formed with the flexible partition wall (28).

11. Suction device (12) according to claim 1, wherein
the sealing protrusion (44) is arranged on the valve housing (18) and protrudes into the control space (30), and
the seal seat (50) is arranged on the flexible partition wall (28).

12. Suction device (12) according to claim 1, wherein the flexible partition wall (28) is designed and arranged in a tensioned manner so that the sealing protrusion (44) and the seal seat (50) are pretensioned in a position spaced apart from one another.

13. Suction device (12) according to claim 1, wherein
the flexible partition wall (28) extends inside the valve housing so that the control space (30) extends on one side of the flexible partition wall (28) and an intake-side space (32) extends on the other side of the flexible partition wall (28), and
said intake-side space (32) is connected to the control space (30) by the throttle passage (38).

14. Suction device (12) according to claim 1, wherein
a suction body (14) is provided for application to an object to be suctioned,
the suction body (14) is arranged on the valve housing (18), and
the flexible partition wall (28) extends within the suction body (14).

15. Suction device (12) according to claim 1, wherein the sealing protrusion (44) has a recess (46) which is open toward the control space (30), including said sealing protrusion being shaped like a funnel having a wide top and a narrow bottom.

16. Suction device (12) according to claim 1, wherein
the flexible partition wall (28) is designed and arranged to snap bistably into a first configuration and a second configuration,
in the first configuration, the sealing protrusion (44) is placed against the seal seat (50), and
in the second configuration, the sealing protrusion (44) is spaced apart from the seal seat (50).

* * * * *